(12) United States Patent
Roth

(10) Patent No.: US 6,334,604 B1
(45) Date of Patent: Jan. 1, 2002

(54) DIRECT DRIVE VALVE BALL DRIVE MECHANISM AND METHOD OF MANUFACTURING THE SAME

(75) Inventor: Jon Roth, Ventura, CA (US)

(73) Assignee: HR Textron, Inc., Valencia, CA (US)

( * ) Notice: Subject to any disclaimer, the term of this patent is extended or adjusted under 35 U.S.C. 154(b) by 0 days.

(21) Appl. No.: 09/593,024

(22) Filed: Jun. 13, 2000

(51) Int. Cl.[7] .................................................. F16K 31/04
(52) U.S. Cl. ..................... 251/129.11; 251/251; 74/55; 137/625.65; 137/331; 29/890.129
(58) Field of Search ................... 251/129.11, 129.12, 251/129.13, 251; 137/15.18, 15.21, 331, 625.65, 596.17; 29/890.124, 890.126, 890.129, 890.131, 890.132; 74/55, 56

(56) References Cited

U.S. PATENT DOCUMENTS

| | | |
|---|---|---|
| 1,964,687 A | 6/1934 | May |
| 2,025,223 A | 12/1935 | Watson |
| 2,025,224 A | 12/1935 | Dodge |
| 2,166,111 A * | 7/1939 | Bancroft ........................ 417/510 |
| 3,227,068 A | 1/1966 | Newhall |
| 3,952,395 A | 4/1976 | Crossman et al. ............. 29/401 |
| 4,428,248 A * | 1/1984 | Broucksou et al. ........... 74/55 X |
| 4,436,163 A * | 3/1984 | Simpson ........................ 173/117 |
| 4,573,494 A | 3/1986 | Spurbeck ....................... 137/331 |
| 4,645,178 A * | 2/1987 | Martin et al. ....... 251/129.11 X |
| 4,672,992 A | 6/1987 | Vanderlaan et al. .......... 137/331 |
| 4,793,377 A | 12/1988 | Haynes et al. ........... 137/625.65 |
| 5,052,441 A | 10/1991 | Hair et al. ................ 137/625.65 |
| 5,248,124 A | 9/1993 | Nugent ...................... 251/129.11 |
| 5,263,681 A * | 11/1993 | Laux ......................... 251/129.11 |
| 5,297,906 A | 3/1994 | Durand .......................... 409/131 |
| 5,390,411 A | 2/1995 | Vogt et al. ............... 29/890.131 |
| 5,598,636 A * | 2/1997 | Stolzer ........................... 74/55 X |
| 5,899,437 A * | 5/1999 | Quarre ....................... 251/251 X |
| 6,000,678 A * | 12/1999 | Coakley .................... 251/129.11 |

OTHER PUBLICATIONS

Japanese Abstract Entitled: Manufacture of Ball Valve Equipped with Seat for Spring; 57–184769(A); Takehiko Sasayam.

* cited by examiner

Primary Examiner—Kevin Shaver
Assistant Examiner—Eric Keasel
(74) Attorney, Agent, or Firm—Fulbright & Jaworski L.L.P.

(57) ABSTRACT

A direct drive servo-valve wherein rotational motion of a drive motor rotor is converted into linear motion of a spool valve. The drive motor includes a shaft which has affixed to the end thereof a ball which engages the spool valve. The ball is affixed to the shaft by providing a bore internally of the shaft which is disposed eccentrically to the longitudinal axis of the shaft. The ball has a portion thereof ground of so as to provide an integral protrusion which is received within the bore in the end of the shaft. The ball is permanently affixed to the shaft by brazing the protrusion into the bore and a planar surface which surrounds the base of the protrusion to the end of the shaft against which it mates.

15 Claims, 2 Drawing Sheets

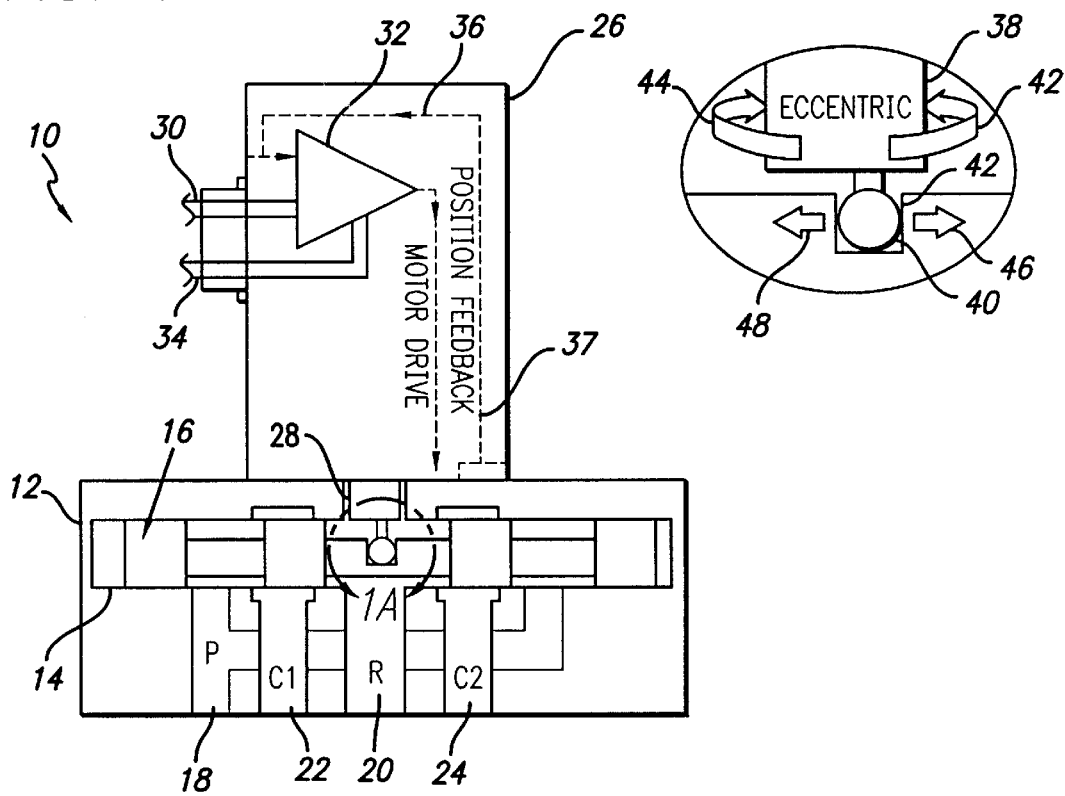
FIG. 1
FIG. 1A
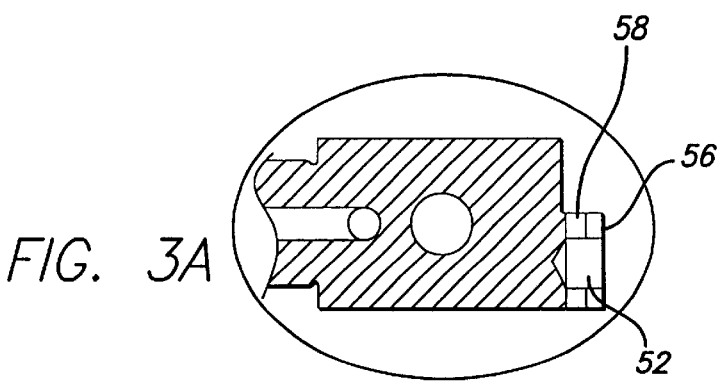
FIG. 3A
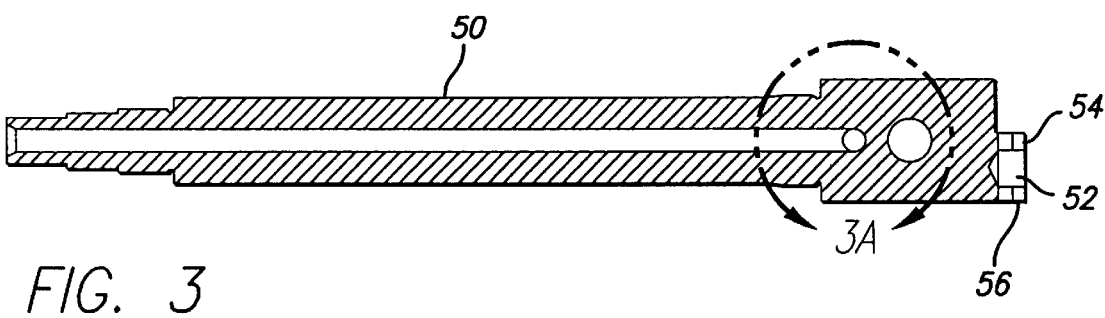
FIG. 3

FIG. 2
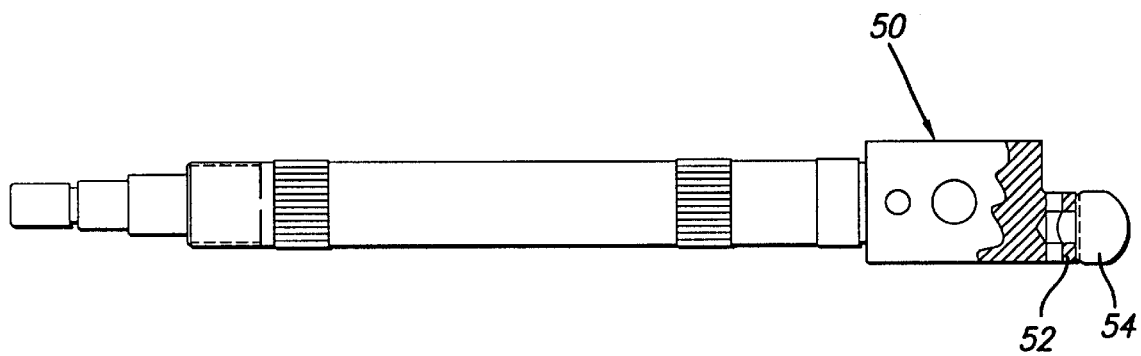
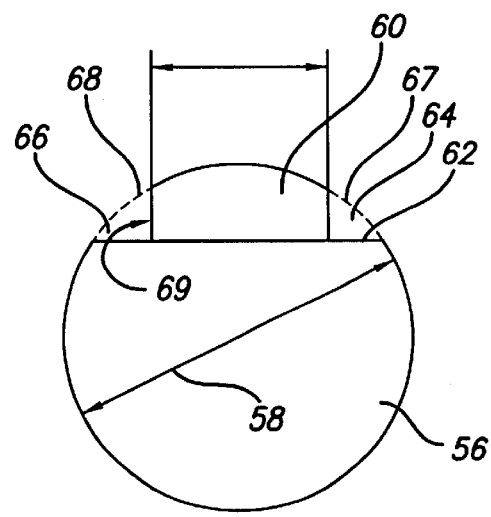
FIG. 4

DIRECT DRIVE VALVE BALL DRIVE MECHANISM AND METHOD OF MANUFACTURING THE SAME

FIELD OF THE INVENTION

This invention relates generally to direct drive servo-valves and more particularly to a direct drive servo-valve in which rotational motion of a motor rotor is converted into linear motion of a spool valve and specifically to a novel drive connection between a shaft of the motor rotor and the spool valve.

BACKGROUND OF THE INVENTION

Torque motor driven spool valves are well known in the art including such which operate through the utilization of a rotary torque motor having a drive member extending from the rotor thereof into contact with the spool valve to directly reciprocate the spool valve within a bore provided in the valve housing to thereby control the flow of fluid from a source thereof to the load in response to electrical signals applied to the drive motor. Such devices are commonly referred to as direct drive valves and there are various ways of interconnecting the shaft to the spool valve in an eccentric manner so as to convert the limited angle rotary motion of the motor rotor shaft to linear motion of the spool valve.

One example of such a prior art connection is illustrated in U.S. Pat. No. 4,793,377 which discloses the utilization of a spherical tip which is formed integrally with the shaft of the motor rotor and engages the spool valve to control the fluid flow through the valve housing.

Another prior art direct drive valve utilizing a spherical ball drive mechanism is shown in U.S. Pat. No. 4,573,494. Therein disclosed is a spherical bearing assembly which includes an outer race disposed upon the spool valve and a spherical bearing member disposed upon the end of the motor rotor shaft in a slip-fit manner with the outer surface thereof being received within the inner surface of the outer race member.

A further prior art connecting device for the drive member is shown in U.S. Pat. No. 5,052,441 which discloses a ball having a hole drilled therein which receives the end of the eccentrically disposed shaft on the motor rotor with the ball and the shaft brazed together. Typically devices of this type utilize a hardened ball which is required to withstand the frictional wear between the ball and the opening in the spool valve. Because the ball is of hardened material, the hole therein is typically machined by electron-discharged machining (EDM). The shaft extending from the motor rotor is machined to provide a cylindrical post having a diameter such that it is received within the opening formed by EDM in the ball. The utilization of the EDM operation is expensive and leaves a re-melt layer on the ball which must be removed before the post is permanently affixed to the ball by a brazing operation. The removal of the re-melt layer is usually done by lapping which is an expensive operation as is the EDM machining. If the re-melt layer is not completely removed, then the brazing will not accomplish adherence of the ball material to the post on the shaft resulting in a weak braze joint which can in turn cause failures of the direct drive valve during use.

There is thus needed a simple way of providing a spherical ball drive mechanism at the end of the motor rotor shaft for engagement as the drive member for a spool valve on a rotary direct drive valve.

SUMMARY OF THE INVENTION

A direct drive servo-valve including a valve housing having a valve spool reciprocally received within a bore provided therein for controlling fluid flow therethrough along with a motor means having a drive member for engagement with the valve spool which drive member includes a shaft having a longitudinal axis and an end defining an eccentrically disposed bore with a ball having an integral protrusion thereon sized such that the protrusion is adapted to be received within the bore with the ball being permanently secured to the shaft.

In accordance with a further aspect of the present invention there is provided a method of manufacturing a direct drive servo valve which includes forming an eccentrically disposed bore in one end of a shaft of a drive member which engages a spool for controlling the flow of fluid, providing a ball, removing a portion of the ball to provide a protrusion thereon and then securing the ball to the end of the shaft in a permanent fashion such as by brazing.

BRIEF DESCRIPTION OF THE DRAWINGS

FIG. 1 is a schematic diagram of a direct drive servo valve which incorporates the drive member of the present invention;

FIG. 1a is a magnified view of a portion of the structure illustrated in FIG. 1;

FIG. 2 is a partial cross-sectional view of a drive member assembly constructed in accordance with the principles of the present invention;

FIG. 3 is a cross-sectional view of a shaft taken about the lines 3—3 of FIG. 2;

FIG. 3A is a magnified view of a portion of the drive shaft similar to that shown in FIG. 2 but without the ball;

FIG. 4 is a view of the ball which is used as a part of the drive member illustrated in FIG. 2 and constructed in accordance with the principles of the present invention.

DETAILED DESCRIPTION

By reference to FIG. 1 there is shown generally at 10 a direct drive servo valve of the type which utilizes the direct drive valve ball drive mechanism constructed in accordance with the principles of the present invention. As is therein shown a valve housing 12 defines a bore 14 therein. A spool valve 16 is disposed within the bore 14 and reciprocates within that bore.

Through the spool valve 16 reciprocation the flow of fluid under pressure to and from a load (not shown) is controlled. The fluid under pressure designated "P" is present within the conduits or passageways 18 which communicate with the bore 14 as shown. The return or sump designated by "R" is present within the conduit or passageways 20. When the spool 16 is caused to moved to a position such as that shown in FIG. 1, fluid under pressure flows from the conduits 18 through the port which is opened by the spool valve 16 and into the control conduit or passageway designated "C1" at 22 to the load and returns from the load through the control conduit or passageway "C2" at 24 and returns to the return or sump R through the port opened by the spool valve 16. As known by those skilled in the art if the spool 16 moves towards the left the flow to and from the load is reversed from that just described.

Attached to the valve housing 12 is a motor means 26 which includes a drive member 28 which engages the spool 16. The drive member 28 rotates about a limited angle and such rotation is translated into reciprocal linear movement of the spool valve 16. The rotation of the drive member 28 is controlled by command signals which are applied to electrical leads 30 which are connected to an appropriate amplifier 32 having an appropriate source of electrical power 34 connected thereto. The output of the amplifier 32 is applied to the stator of the drive motor 26. If desired an appropriate position feedback signal may be applied to the amplifier 32 as shown by the dashed line 36. The position feedback signal may be generated by a position transducer 37 which provides an electrical signal proportional to the rotary position of the rotor of the drive motor 26 or alternatively the linear position of the spool valve 16 depending upon the particular application and structure of the device being controlled.

As shown more specifically in FIG. 1*a* the drive member 28 may include a motor rotary shaft 38 which has an eccentrically mounted ball 40 affixed thereto. The ball 40 fits within an appropriate opening which may be a bore or a slot or a groove formed within the spool 16. As is well known to those skilled in the art as the shaft rotates in either direction as shown by the arrows 42 and 44, the ball positioned within the opening 42 causes the spool valve to linearly move as indicated by the arrows 46 and 48, respectively, so as to control the fluid flow as above described.

As indicated above, the ball 40 may be fixed to the shaft 38 in various ways such as by being formed integrally with the shaft, by having the shaft end extend through an opening formed within the ball or by the utilization of a spherical bearing assembly or the like. In each instance these structures are relatively expensive to manufacture and thus add to the overall cost of the rotary direct drive valve.

In accordance with the principles of the present invention the drive member which engages the spool is constructed by a totally different method and configuration which substantially reduces the manufacturing cost of the structure.

By reference now to FIG. 2 there is illustrated the assembly of a shaft utilized within a motor means of the direct drive servo valve constructed in accordance with the principles of the present invention. As is illustrated in FIG. 2 a shaft 50 has eccentrically disposed on one end 52 thereof a ball 54. The shaft 50 is adapted to be supported within the rotor of the motor means by appropriate bearings or the like as is well known to those skilled in the art. Such structure does not form a part of the present invention but is clearly illustrated in prior art U.S. Pat. No. 5,052,441 which is incorporated herein by this reference and as a result, further detailed description of the motor means will not be provided herein. By reference to FIGS. 2 through 5 the manner in which the drive member is constructed in accordance with the principles of the present invention will be described in further detail. As is shown the shaft 50 defines a bore 52 which is eccentrically offset from the longitudinal axis 54 of the shaft 50. As is seen particularly in FIG. 3A the shaft 50 defines a substantially planar surface 56 which surrounds the bore 52. There is also provided a cross bore 58 which intersects the bore 52. The purpose of the cross bore 58 will be described more in detail hereinafter.

As above pointed out the spool valve 16 is contacted by a ball disposed within the opening 42 to cause it to reciprocate within the bore 14. In accordance with the principles of the present invention such a ball is shown in FIG. 4. As is therein illustrated there is provided a ball 56 which has a diameter 58. A protrusion 60 is formed integrally with the ball 56 and extends therefrom. A planar surface 62 surrounds the base of the protrusion 60. As will be recognized by those skilled in the art, the protrusion 60 formed as an integral part of the ball 56 is best formed by removing that portion of the ball which is shown within the volumes 64 and 66 defined by the dashed lines. It will be recognized that the "volumes" is really a continuous volume defined by the planar surface 62 and the outer perimeter of the protrusion 60 and the surface of the ball 56 as defined by the dashed lines 67 and 68. The volume may be removed from the ball 56 to provide the protrusion 60 in various manners. The most desirable in accordance with the preferred form of the present invention is to secure the ball within a proper fitting and then grind away the volume above referred to leaving the protrusion 60 as a post extending from the planar surface 62. The amount of material removed in order to provide the protrusion 60 may vary according to the particular application and strength of the structure as desired. It is however important that the length of the protrusion 60 be less than a radius of the ball 56. Such construction is necessary so that a complete surface for the ball 56 is provided about its equator so that there will be line contact between the ball and the opening 42 in the spool valve 16 in order to obtain appropriate operation of the direct drive servo valve. In accordance with a preferred embodiment of the present invention the length of the protrusion 60 measured along a diameter of the ball 56 is between 20% and 60% of the radius of the ball 56.

The ball 56 is permanently secured to the shaft 50. Such permanent attachment may be accomplished by various means known to those skilled in the art. Preferably a brazing compound is applied to the protrusion 60 so as to substantially cover the outer perimeter or outer radial surface 69 thereof and to the planar surface 62 of the ball and the ball is then inserted into the bore 52. Thereafter the combination of the shaft and the ball along with the brazing compound contained thereon is elevated to an appropriate temperature and maintained at that temperature for a period sufficient to cause brazing of the ball to the shaft by permanently adhering the outer perimeter 69 of the protrusion 60 within the bore 52 and to secure the planar surface 62 to the planar surface 56. In this manner the drive member can adequately support the tension load as the shaft rotates to reciprocate the spool valve 16 within its bore 14. By having appropriate brazing of the planar surfaces 56 and 62 as well as the outer perimeter 69 of the protrusion 60 to the inner surface of the bore 52 adds surprising strength to the overall structure. As a result of this strength, the shaft 50 maybe constructed of material which is less expensive than that used in the past. For example, in the past where a post was formed on the shaft and the post was inserted into a hole formed in the ball the shaft was made of much stronger material such as Inconel. In utilizing the structure of the present invention the shaft may be constructed for example of 300 series stainless steel.

Where the ball is permanently secured to the shaft by way of brazing the cross bore 58 is utilized to provide a creep hole so that any excess brazing material which may be present on the ball can travel through the interior of the bore 52 and find relief within the cross bore 58. Also the cross bore 58 provides a vent for gases formed during the brazing process to preclude the same being trapped within the bore 52. It has also been found that the cross bore 58 provides a convenient inspection port which may be utilized after the manufacture of the drive member, as above described, to determine whether it has been properly formed, that is, that the ball 56 has been fully secured to the shaft 50 in the manner above described.

What is claimed is:

1. A direct drive servo-valve comprising:
   (1) A valve housing defining a bore therein;
   (2) A valve spool reciprocally received within said bore for movement to control fluid flow therethrough from a supply port to a load;
   (3) Motor means including a drive member for engagement with said valve spool at a predetermined point to move said valve spool in said bore, said drive member comprising:

(a) A shaft having a longitudinal axis and an end defining an eccentrically-disposed bore of a first diameter;

(b) A ball having an integral protrusion of a second diameter;

(c) Said protrusion being received within said bore; and (d) Means for permanently securing said shaft.

2. A direct drive servo-valve as defined in claim 1 wherein said protrusion is formed by removing a portion of said ball.

3. A direct drive servo-valve as defined in claim 1 wherein said protrusion is brazed within said eccentrically disposed bore to permanently secure said ball to said shaft.

4. A direct drive servo-value as defined in claim 3 wherein said first diameter is slightly larger than said second diameter and said protrusion is substantially surrounded by brazing compound.

5. A direct drive servo-valve as defined in claim 1 wherein said ball defines a first substantially planar surface surrounding said protrusion at its base, said shaft defines a second substantially planar surface surrounding said bore, and said first and second planar surfaces are permanently secured together over mutually opposed areas by said means for permanently securing.

6. A direct drive servo-valve as defined in claim 5 wherein said means for permanently securing comprises a brazing compound.

7. A direct drive servo-valve as defined in claim 6 wherein said eccentrically disposed bore has a predetermined depth, said depth being greater than the length of said protrusion.

8. A direct drive servo-valve as defined in claim 7 wherein said shaft further includes a cross bore therethrough intersecting said eccentrically disposed bore, said cross bore being substantially open subsequent to said protrusion being secured to said shaft.

9. A direct drive servo-valve as defined in claim 8 wherein said protrusion is formed by grinding said ball to remove a portion thereof, said portion removed leaving a protrusion having a length less than the radius of said ball.

10. A direct drive servo-valve as defined in claim 9 wherein said protrusion length is between 20% and 60% of the radius of said ball.

11. A method of manufacturing a direct drive servo-valve including a valve housing having a spool valve disposed within a bore therein, a motor means having a drive member for engaging said spool valve to reciprocally move said spool valve within said bore, said drive member including a rotary shaft, said method comprising:

(a) forming an eccentrically disposed bore in one end of drive member rotary shaft;

(b) providing a ball;

(c) removing a portion of said ball to provide a protrusion thereon;

(d) applying a brazing compound to said protrusion;

(e) inserting said protrusion into said bore in said shaft; and (f) heating said shaft and ball to a temperature and for a time sufficient to cause said brazing compound to permanently secure said ball to said shaft.

12. The method of manufacturing as defined in claim 11 which includes the further steps of:

providing a first planar surface surrounding said eccentrically disposed bore formed in said shaft;

forming a second planar surface surrounding said protrusion; and applying a brazing compound to said first and second planar surfaces.

13. The method of manufacturing as defined in claim 12 which includes the further steps of:

forming a cross bore in said shaft which cross bore is disposed from said first planar surface and intersects said eccentrically disposed bore formed in said shaft.

14. The method of manufacturing as defined in claim 13 wherein said step of removing includes grinding and said protrusion is formed having a length equal to less than the radius of said ball.

15. The method of manufacturing as defined in claim 14 wherein said step of forming the eccentrically disposed bore includes forming said eccentrically disposed bore to a depth which is greater than the length of said protrusion by an amount such that said cross bore remains substantially open subsequent to brazing.

* * * * *